US012195117B2

(12) United States Patent
Mire

(10) Patent No.: US 12,195,117 B2
(45) Date of Patent: Jan. 14, 2025

(54) ARTICULATED HYBRID WHEEL

(71) Applicant: Marco Mire, Sedro Woolley, WA (US)

(72) Inventor: Marco Mire, Sedro Woolley, WA (US)

(*) Notice: Subject to any disclaimer, the term of this patent is extended or adjusted under 35 U.S.C. 154(b) by 600 days.

(21) Appl. No.: 17/149,604

(22) Filed: Jan. 14, 2021

(65) Prior Publication Data

US 2021/0214029 A1 Jul. 15, 2021

Related U.S. Application Data

(60) Provisional application No. 62/960,980, filed on Jan. 14, 2020.

(51) Int. Cl.
*B62D 57/02* (2006.01)
*B62D 57/032* (2006.01)

(52) U.S. Cl.
CPC ......... *B62D 57/022* (2013.01); *B62D 57/032* (2013.01)

(58) Field of Classification Search
CPC .... B62D 57/02; B62D 57/022; B62D 57/024; B62D 57/028; B62D 57/032; B62B 5/02; B60B 9/26; B60B 9/28; B60B 19/04; A61G 5/06; A61G 5/061
See application file for complete search history.

(56) References Cited

U.S. PATENT DOCUMENTS

| | | | | |
|---|---|---|---|---|
| 3,179,431 A * | 4/1965 | Pikl | ........................ | A61G 5/061 280/211 |
| 4,648,853 A * | 3/1987 | Siegfried | ............. | A63H 17/262 446/457 |
| 4,906,051 A * | 3/1990 | Vilhauer, Jr. | ........... | B60B 15/12 301/38.1 |
| 7,017,687 B1 * | 3/2006 | Jacobsen | ............. | B62D 57/028 280/5.2 |
| 7,543,663 B2 * | 6/2009 | Setrakian | ............... | B62D 61/00 180/8.1 |
| 7,588,105 B2 * | 9/2009 | Hillis | ................... | B62D 57/022 180/7.1 |
| 8,006,728 B2 * | 8/2011 | McCue | .................. | B60B 21/12 152/14 |
| 9,878,576 B2 * | 1/2018 | Hein | ....................... | B60B 19/04 |
| 10,144,247 B2 * | 12/2018 | Joso | ....................... | B60G 13/04 |
| 10,259,260 B2 * | 4/2019 | Kim | ........................ | B60B 15/18 |
| 10,717,320 B2 * | 7/2020 | Solheim | ................. | B60B 25/00 |
| 10,913,310 B1 * | 2/2021 | Ebrahimi Afrouzi | ... | A47L 9/009 |
| 11,198,218 B1 * | 12/2021 | Gorkavyi | ................. | B25J 19/02 |
| 2012/0319457 A1 * | 12/2012 | Jo | ........................... | B60B 15/16 301/6.1 |
| 2020/0023674 A1 * | 1/2020 | Makanga | .................. | B60B 3/08 |
| 2022/0001531 A1 * | 1/2022 | Kenneally | ................ | B25J 9/102 |

FOREIGN PATENT DOCUMENTS

CN 106697097 A * 5/2017

* cited by examiner

*Primary Examiner* — Christopher B Wehrly
(74) *Attorney, Agent, or Firm* — Janeway Patent Law PLLC; John Janeway

(57) ABSTRACT

A system and method for an articulated hybrid wheel made of an array of identical individual segments forming adjustable limbs which can function independently and in unison to provide the spokes of the wheel for smooth travel over flat terrain with the added advantage of transitioning its shape for greater traction, approach angle, and reach when negotiating vertical change in terrains in an inherently efficient, stable, and robust format.

19 Claims, 13 Drawing Sheets

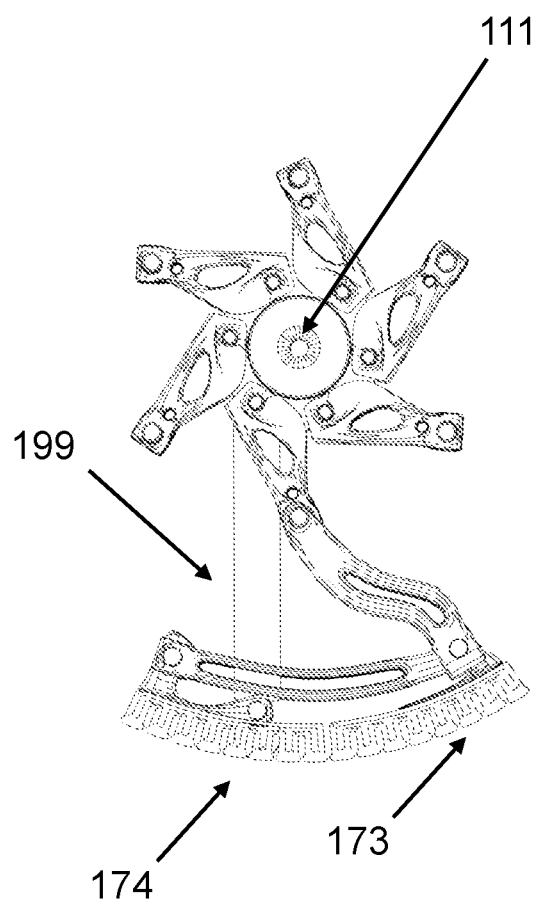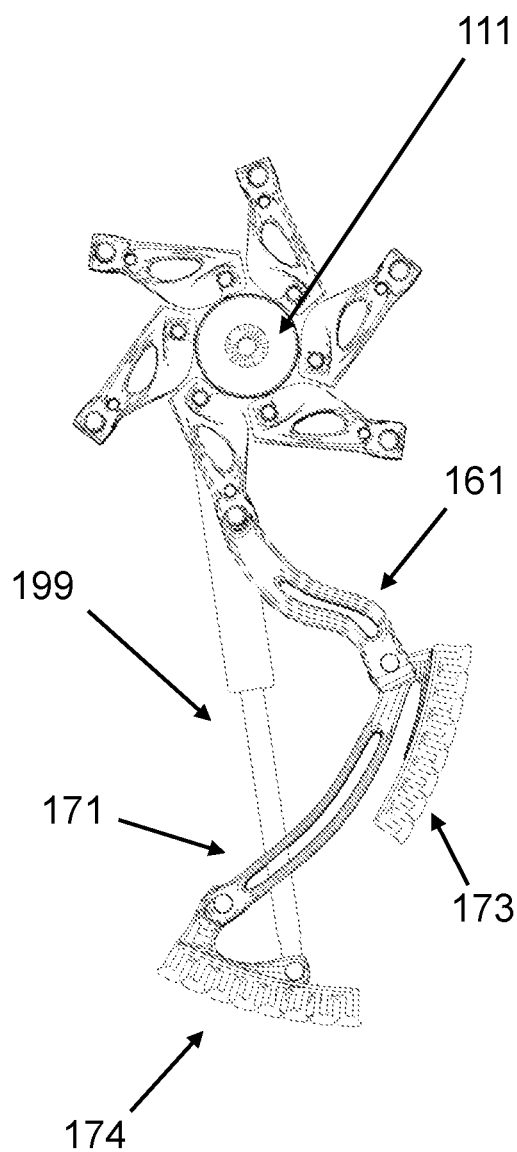
FIG. 5
FIG. 6

ARTICULATED HYBRID WHEEL

CROSS REFERENCE TO RELATED APPLICATIONS

This application is a non-provisional patent application that claims priority to provisional patent application No. 62/960,980 filed on Jan. 14, 2020.

FIELD OF THE DISCLOSURE

The overall invention relates generally to ground transportation over uneven terrain or other substrates and, more particularly, to an articulated wheel that adapts to such terrain or other substrates while providing both support and traction for effective mobility.

BACKGROUND

The basic wheel is a simple machine that has been used in connection with transport for several millennia. Throughout its existence, the wheel has been limited by its ability to transverse obstacles and rugged terrain. For example, even modern wheelchairs are generally unable to transition up/down curbs and stairs, which are commonplace in even the most developed urban settings. Similarly, despite their comparatively great abilities, wheeled off-highway vehicles (OHVs) are unable to transit over such obstacles beyond certain limits, which are often dictated by practical design factors, such as maximum practical wheel diameter, for example. Variations on the wheel, such as continuous track systems, also have significant limitations, and also tend to be large, heavy, complex and maintenance-intensive, to the point where they are unsuitable for many applications.

A partial solution, also in use for millennia, is to smooth/even out the terrain and provide ramps of various kinds to transition between different heights. This continues today, for example, with the installation of ramps at curbs and building entrances to provide wheelchair access. However, grading and providing ramps over the entire world is obviously a practical impossibility. In view of these issues, numerous entities are presently developing alternative solutions in the form of exoskeletons and other powered mobility products. However, as a group, these tend to be extremely costly and have limited scope, and/or are still far from being practically feasible.

Thus a need exists for improved solutions for transport and mobility, such as for persons confined to wheelchairs and for persons and vehicles transiting rough and/or irregular terrain. For example, those requiring assisted personal mobility often live in places where geology, legacy infrastructure, poverty, or negligence result in imperfect solutions and lack access

SUMMARY

In one embodiment, the system is directed to an articulated wheel for transiting smooth and uneven ground in order to achieve geometric strength in two modes of operation, rolling wheel mode and extended reach mode, said articulated wheel comprising: a radial hub, and a plurality of articulated wheel segments arranged in a radial array about the radial hub, each articulated wheel segment of the plurality of articulated wheel segments comprising: a radially extensible support member; a foot member in a pivotable connection with an outer end of the radially extensible support member wherein the foot member is adjustable at an angle to be in a first orientation adapted for contact with uneven ground when the radially extensible support member is in an extended position, and in a second orientation for forming a portion of a generally circular outer ring of the articulated wheel when the radially extensible support member is in a retracted position, the articulated wheel of claim further comprising a drive mechanism, wherein the drive mechanism extends and retracts the radially extensible support members in a sequential manner as the articulated wheel rolls over uneven ground, wherein the drive mechanism maintains the radially extensible support members in the retracted position as the articulated wheel rolls over smooth ground, the articulated wheel, further comprising one or more sensors connected to a control system, the one or more sensors configured to generate input data representative of conditions during operation and to provide input data to the control system, the control system configured to store one or more expected reference values, to compare the input data with the one or more expected reference values, and to output an output signal, the output signal derived from the comparison of the input data with the one or more expected reference values, the output signal configured to perform one or more actions in at least the drive mechanism to satisfy a condition of the input data returning to the one or more expected reference values, wherein the drive mechanism comprises a high-torque harmonic drive geared hub motor or mechanical linkage to a central motor, wherein the drive mechanism comprises a hydraulic, pneumatic, electric, or mechanical system, wherein the drive mechanism comprises one or more actuators connected to the foot member and the radial hub, wherein the one or more actuators drive one or more pivot points to form a desired shape in a relative Cartesian coordinate position, the articulated wheel further comprising a knee member connected to the radially extensible support member, the knee member adapted for contact with the uneven ground when the radially extensible support member is in the first orientation or the second orientation, wherein when the knee member is in contact with the uneven ground the knee member is at different point and angle from the foot member on a same articulated wheel segment of the plurality of articulated wheel segments, wherein the knee member and the foot member are made of a synthetic rubber or a suitable material for traction and durability, wherein the one or more sensors are a LIDAR system for determining if the articulated hybrid wheel is approaching a wall or a raised object, wherein the one or more sensors are a LIDAR system for determining if the articulated hybrid wheel is approaching a drop off, wherein the one or more sensors are a LIDAR system for determining if the articulated hybrid wheel has come in contact with another object, the articulated wheel further comprising a solar energy collector for collecting and converting solar energy to electrical energy to power the articulated wheel.

In another embodiment, the system is directed to an articulated wheel for transiting smooth and uneven ground, said articulated wheel comprising: a hub, and a plurality of articulated wheel segments arranged in a radial array about the hub, each articulated wheel segment of the plurality of articulated wheel segments comprising: a radially extensible support member, a second support member connected to an inner end of the radially extensible support member, a third support member connected to an inner end of the second support member, the third support member connected to the hub at an inner end of the third support member; a foot member in a pivotable connection with an outer end of the radially extensible support member wherein the foot member is adjustable at an angle to be in a first orientation adapted for contact with uneven ground when the radially extensible support member is in an extended position, and in a second orientation for forming a portion of a generally circular outer ring of the articulated wheel when the radially extensible support member is in a retracted position, wherein the radially extensible support member is elongated and arching in shape with a concave and convex surface, wherein the second support member is elongated with a tilde shape, wherein a middle length of the third support member is of greater width than the inner end and an outer end wherein shape and dimensions of components of the articulated wheel and the articulated wheel segments are based on the number of divisions of the articulated wheel segments and ability of divisions to form a whole wheel when retracted, and a number of extended feet when deployed, wherein a linear actuator is connected to an inside surface the foot member by a pivotable connection, wherein a knee member connected to the convex surface of the second support member, the knee member adapted for contact with the uneven ground in the first orientation and the second orientation, wherein when the knee member is in contact with the uneven ground the knee member is at a different point and angle from the foot member on a same articulated wheel segment of the plurality of articulated wheel segments.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 5 illustrates an articulated segment component diagram in a roll mode.

FIG. 6 illustrates an articulated segment component diagram in a climb mode.

DETAILED DESCRIPTION

Figure 1:
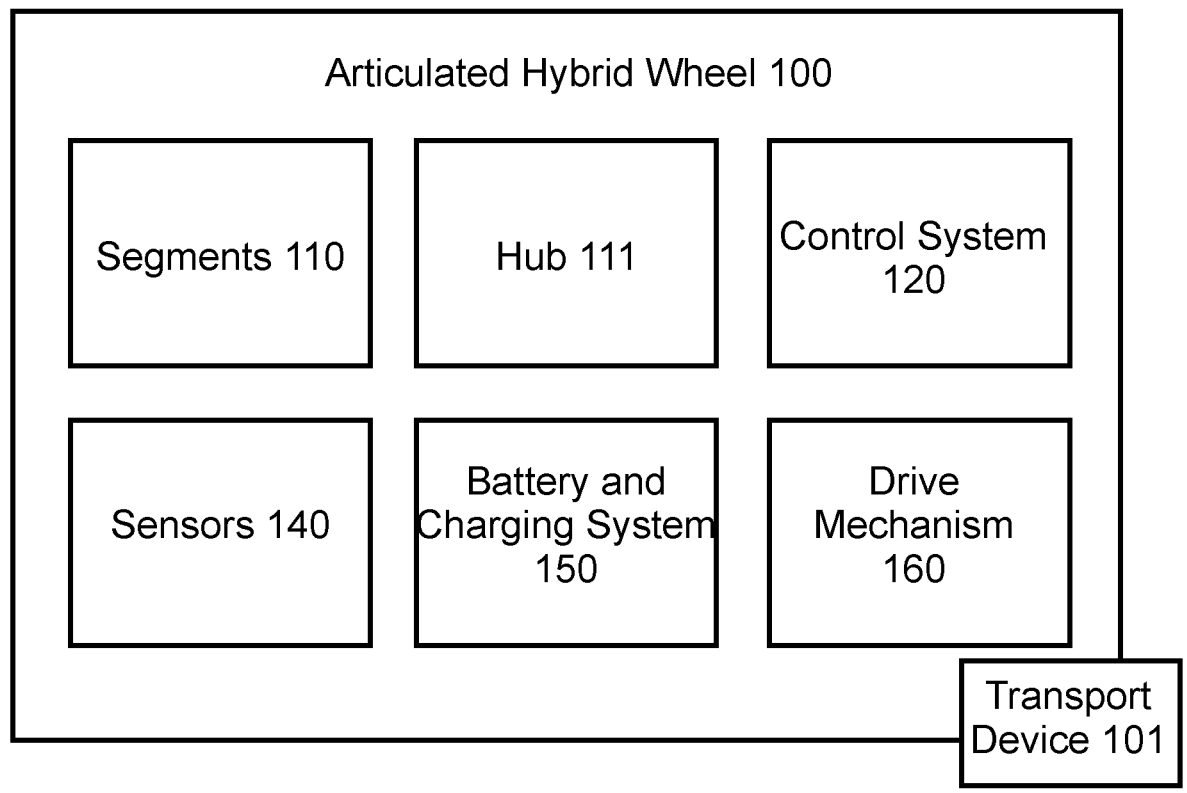
FIG. 1 illustrates a block diagram of the components of Articulated Hybrid Wheel.

In the Summary above and in this Detailed Description, and the claims below, and in the accompanying drawings, reference is made to particular features (including method steps) of the invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with and including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for one or more Articulated hybrid wheels 100 for transport and mobility on a transport device 101, as illustrated in FIG. 1, such as for transporting persons, machines, and devices over rough irregular terrain or transporting persons, machines, and devices to different planes, levels, or heights. Articulated hybrid wheel 100 may be made of an array of identical individual segments forming adjustable limbs which can function independently and in unison to provide the spokes of the wheel for smooth travel over flat terrain with the added advantage of transitioning its shape for greater traction, approach angle, and reach when negotiating vertical change in terrains in an inherently efficient, stable, and robust format. Articulated hybrid wheel 100 may have a control system 120, sensors 140, battery and charging system 150, and a drive mechanism 160. In other embodiments transport device 101 may have a control system 120, sensors 140, battery and/or charging system 150, whereby articulated hybrid wheel 100 is in communication with these components of transport device 101.

Figure 2:
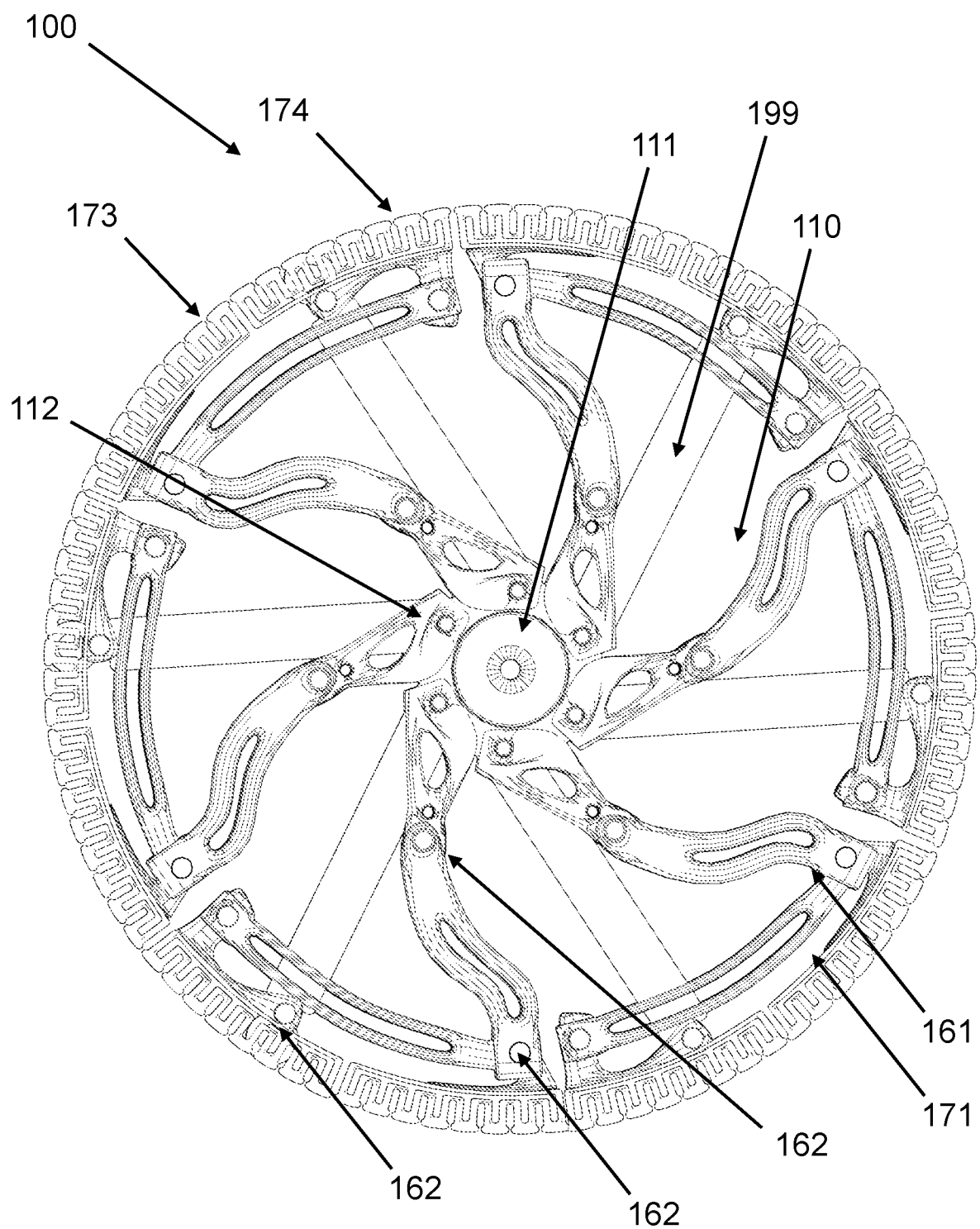
FIG. 2 illustrates a side view of Articulated Hybrid Wheel.
Figure 3:
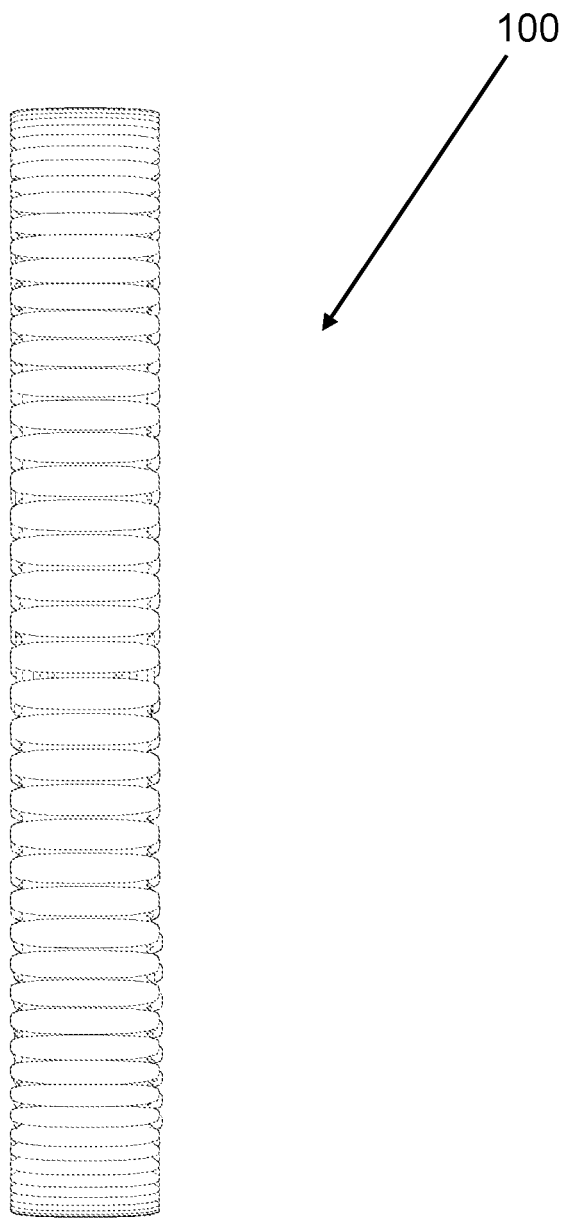
FIG. 3 illustrates a front view of Articulated Hybrid Wheel.
Figure 9:
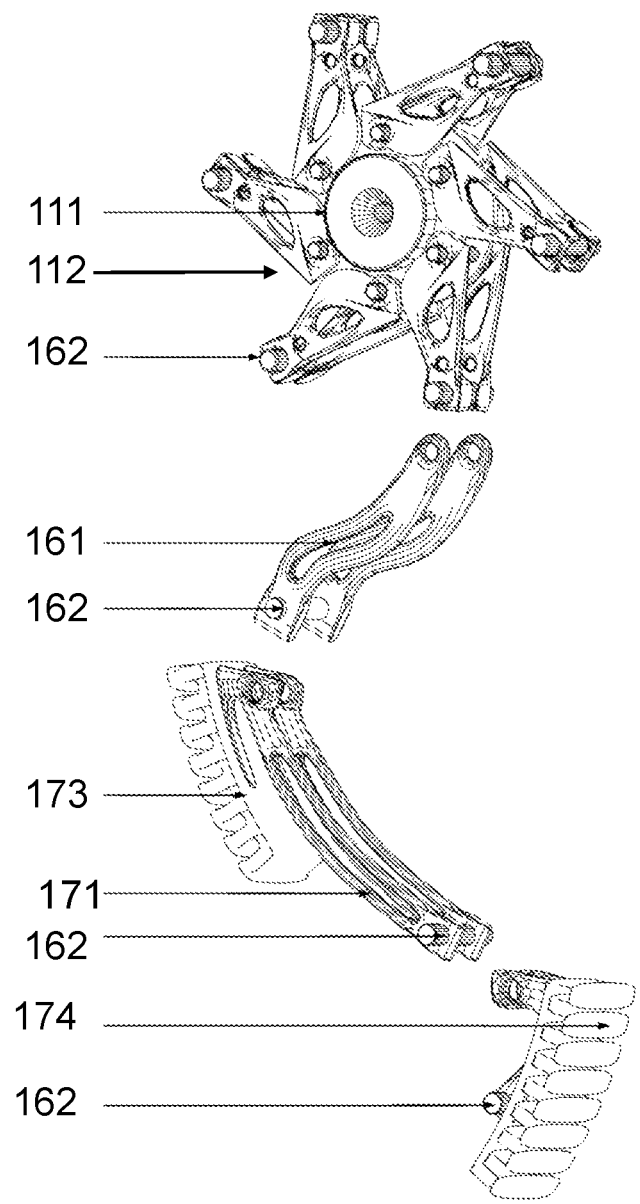
FIG. 9 illustrates an exploded view of Articulated Hybrid Wheel.
Figure 10:
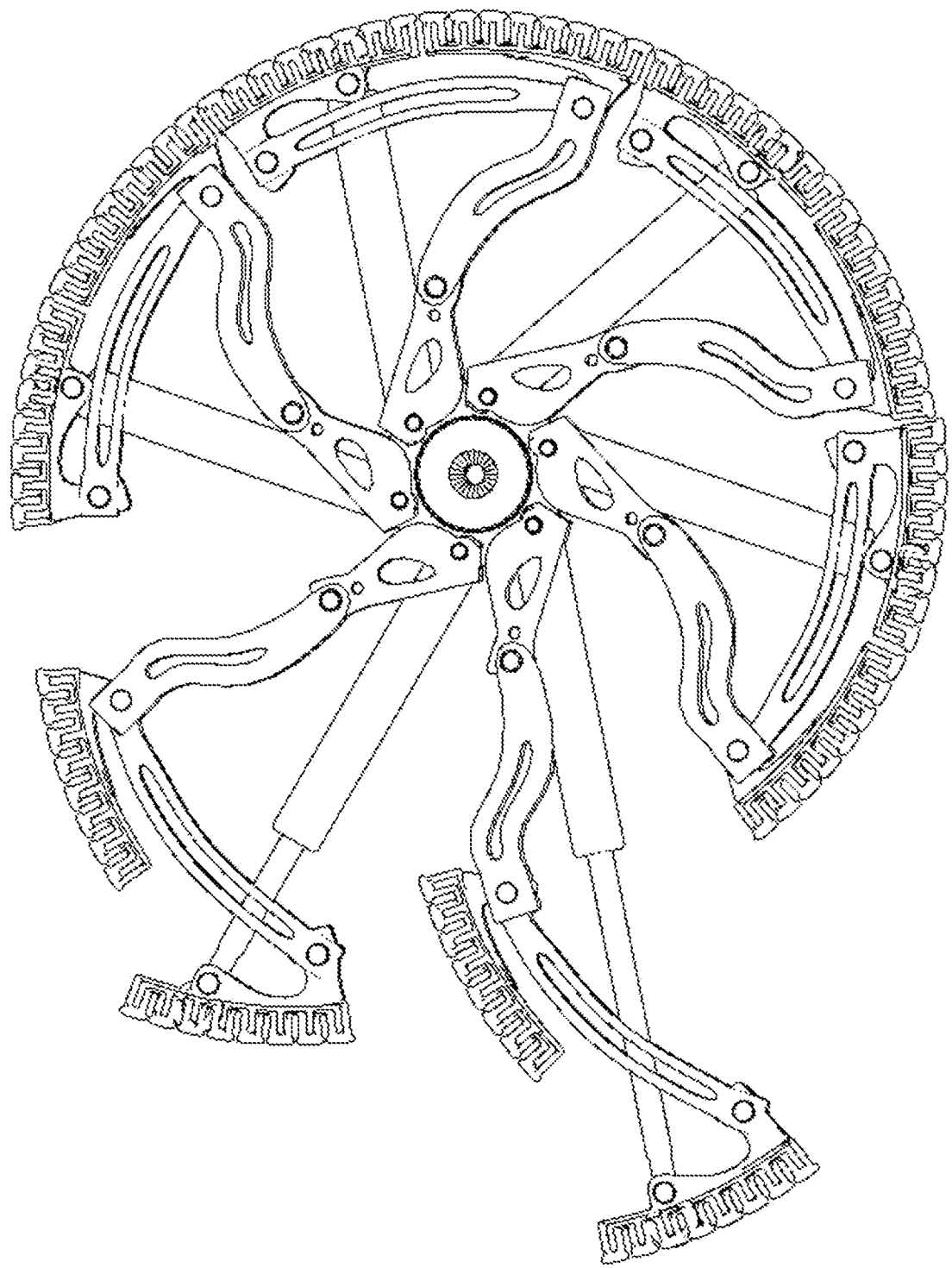
FIG. 10 illustrates the transition of Articulated Hybrid Wheel from roll mode to climb mode.
Figure 11:
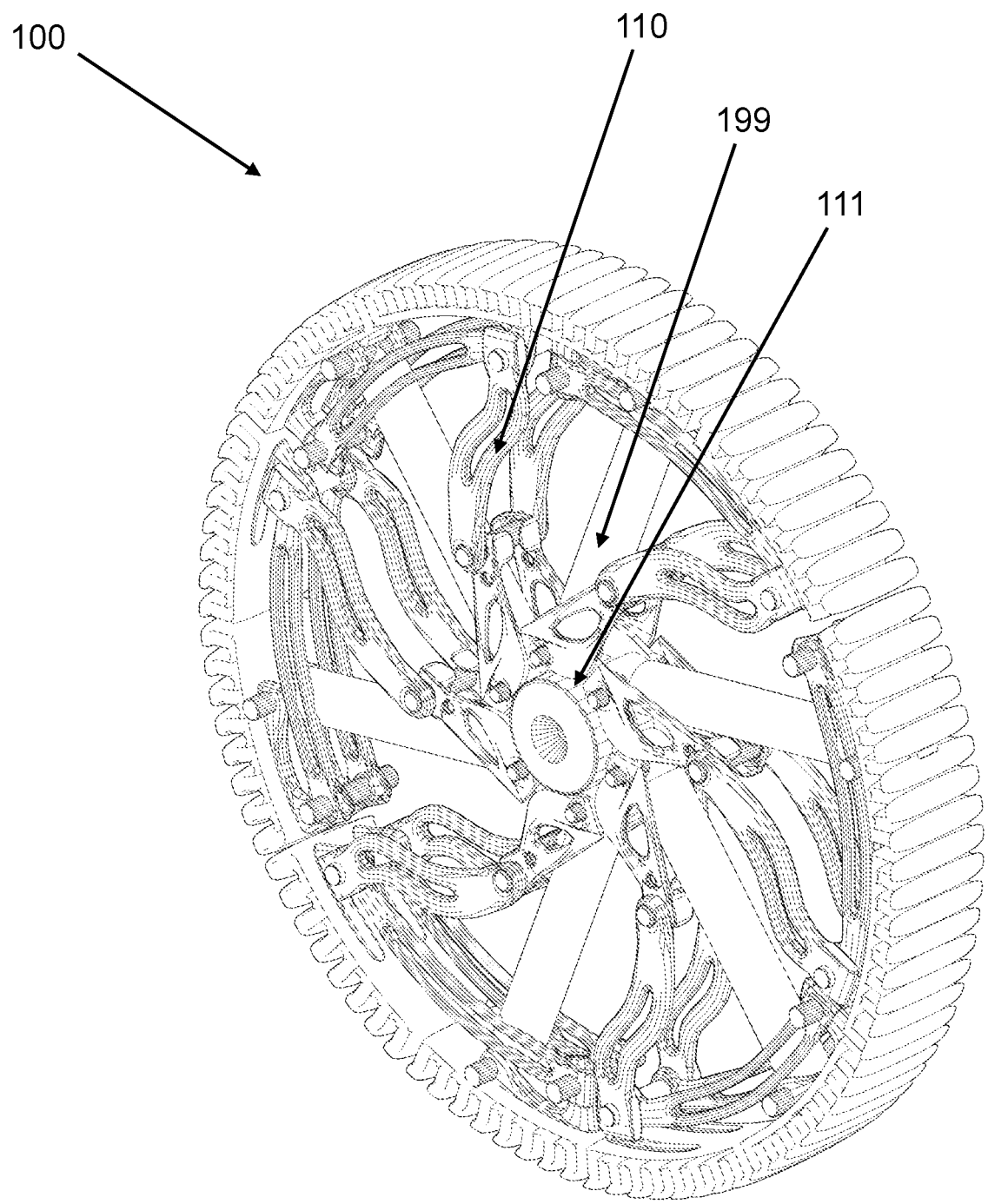
FIG. 11 illustrates a perspective view of Articulated Hybrid Wheel.

Articulated hybrid wheel 100 may be an independent powered hub motor or connected to a central motor of a transport device 101 by an axle/rod or chain drive. Articulated hybrid wheel 100 may include one or more independent powered articulated segments 110 arranged in a radial array around a hub 111 for rolling like a wheel in their initial configuration and able to transition as individual dynamic kinematic linked chains, comparable in anatomical structure to a leg or an arm, required for climbing obstacles, as illustrated in FIG. 2. Independently powered articulated segments 110 may be connected to hub 111 by one or more pivots 162 on one or more base links 112 whereby base links 112 act similar to a hip or shoulder, as illustrated in FIG. 9. Base links 112 may be connected to hub 111 by one or more pivots 162. Base links 112 may have a bulbous knife shape with a middle length of greater area than an outer end and inner end. Base links 112 may have one or more apertures for load distribution or ornamental purposes.

Independently powered articulated segments 110 may include a first linkage component 161 and a second linkage component 171 pivotally connected to first linkage component 161 by a pivot 162 which may be attached at the center or at the ends, based on dexterity versus force required, as illustrated in FIG. 9. First linkage component 161 may be elongated in form with a tilde shape extending outward and connected to base links 112 by one or more pivots 162. In other non-limiting embodiment first linkage component 161 may be tilde or Arc shape depending on the spectrum of variables/number of divisions/segments for Articulated hybrid wheel 100. For instance tilde shape would be designed more for strength and arc shape for reach.

Second linkage component 171 may be elongated with an arching shape having a concave surface and convex surface along the length of second linkage component 171, acting as an ankle or wrist. In some configurations second linkage component 171 is an actuator pivot point similar diametric twin wheel.

Foot tread 174 and knee tread 173 may be a part of the opposing ends of an outer drive ring. Foot tread 174 and knee tread 173 may be fused or segmented and similarly may be connected to the assembly by a pivot joint or pivot point as required by the number of divisions of Articulated hybrid wheel 100. for independent and unfettered function over rough terrain.

Foot tread 174 may be pivotally connected to second linkage component 171 at the outer end of second linkage component 172 by a pivot 162 which may be attached at the center or at the ends of second linkage component 171, as illustrated in FIG. 5. Foot tread 174 is designed of suitable material for prolonged contact with a surface such as synthetic rubber, natural rubber, or plastic polymers. In one or more embodiments, foot tread 174 may be made of a similar configuration to a tire with a bead bundle or assembly to secure the tire to linkage component 172, bead filler to tune ride and handling characteristics, one or more belts provides stability to the tread area of foot tread 174, body ply to provide structure of the tire and provide the strength to contain the inflation pressure, inner liner used to retain the inflation pressure inside foot tread 174, one or more sidewalls to cover the body plies on the sides of knee foot tread 174, which provides abrasion, scuff and weathering resistance, and a tread pattern to provide grip and abrasion resistance contributing to traction and treadwear.

Knee tread 173 may be fastened to second linkage component 171 at the convex surface and is designed of suitable material for prolonged contact with a surface such as synthetic rubber, natural rubber, or plastic polymers, as illustrated in FIG. 5. Knee tread 173 may be made of a similar configuration to foot tread 174 and forms the outer surface of articulated wheel hybrid 100 where knee tread 173 is also designed of suitable material for prolonged contact with a surface. Knee tread 173 is designed to contact uneven ground at a different angle than foot tread 174 such as at an angle perpendicular to foot tread 174 whereby the combination of knee tread 173 and foot tread 174 allow articulated hybrid wheels to transport over uneven terrain in climbing mode. Multiple knee treads 173 and foot treads 174 may be in contact with the ground, increasing the contact points (which is the whole point) such as up and down stairs, in parking mode, or standing erect mode.

Foot tread 174 and knee tread 173 may be any length and size to accommodate for different uses. For example a smaller foot tread can be attained by the subdivision of the outer ring section into a number of smaller sections. This is advantageous in human spaces, taking into account civic building codes and infrastructure dimension allowing for a larger wheel (increased reach) to operate within limited space for improved general access and accuracy.

In an initial configuration, independently powered articulated segments 110 cooperate to define a generally circular outer driving ring similar in form to a conventional rolling wheel with foot treads 174 operating as arching components to form a circle, as illustrated in FIG. 5. In an active configuration, independently powered articulated segments 110 may operate to extend and retract in a synchronized manner to change the outer shape of the wheel based on desired function and environment whereby foot treads 174 and knee treads come into contact with one or more surfaces or two opposing independently powered articulated segments 110 extend outward such that transport device 101 may be raised to a greater elevation by the length of the extension of the independently powered articulated segments 110.

The combination of structural design and materials selection can create a solid construction that is capable of surviving extreme conditions. The segments serve as protective and structural link elements. The outer structure of articulated hybrid wheel 100 including foot treads 174 inherently guards the segments by surrounding them. Furthermore, if an impact occurs on the side of articulated hybrid wheel 100, independently powered articulated segments 110 protect drive mechanism 160. The combined chassis not only forms a strong and light structure which maintains its shape when rolling or climbing, but also may be made flexible enough to absorb impact loads and other external forces.

The radial configuration of independently powered articulated segments 110 may vary depending on design factors, such as in the number of segments, number of pivots, wheel diameter, hub diameter, wheel width, configuration, and number of wheels. Furthermore, families of similar models may be designed for various types of raising and lowering platforms and vehicles. The independently powered articulated segments 110 configuration may be highly customizable to maximize its capabilities and is likewise adaptable to many different applications and markets.

Figure 13:
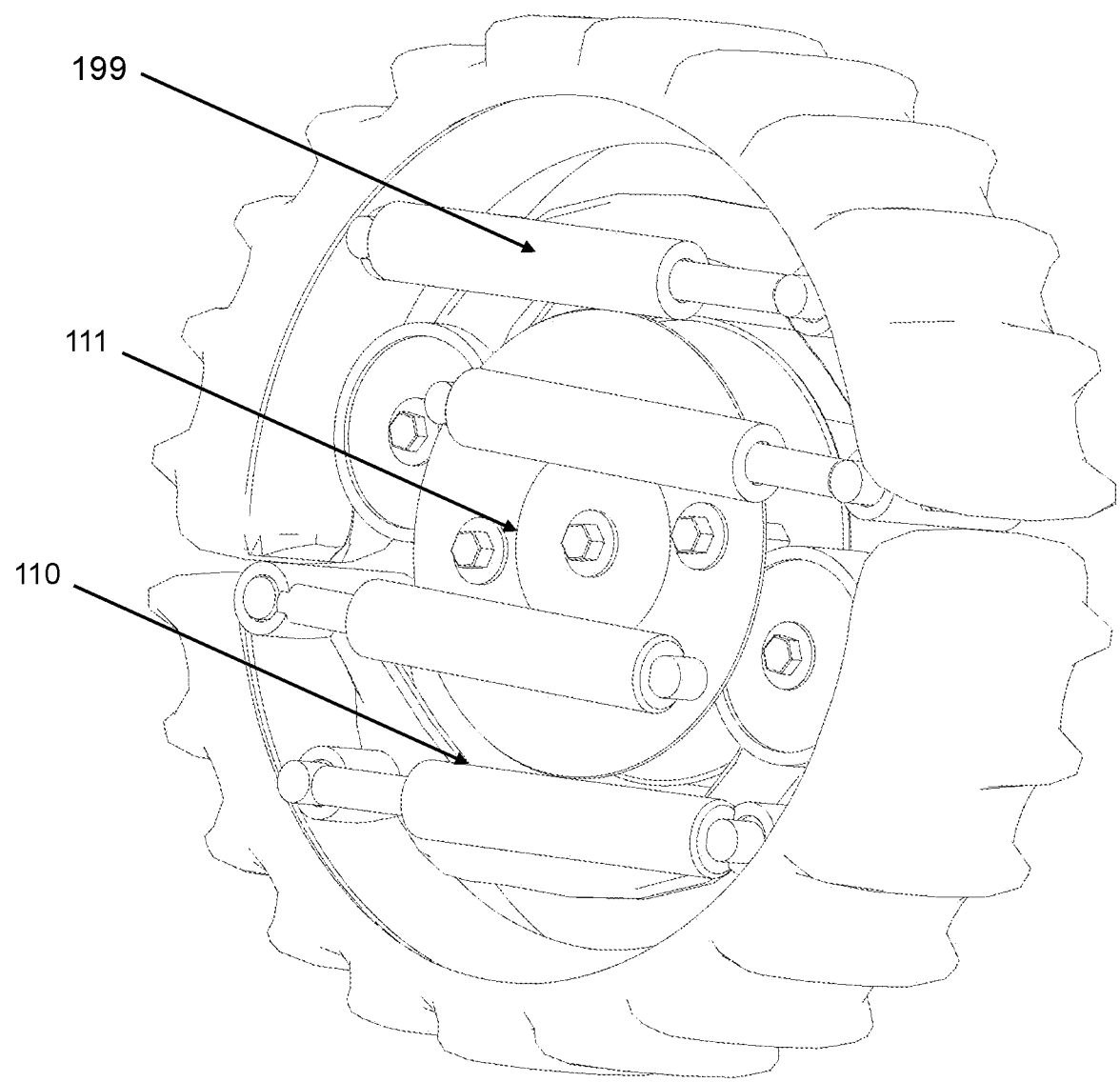
FIG. 13 illustrates a perspective view of a second embodiment of Articulated Hybrid Wheel
Figure 14:
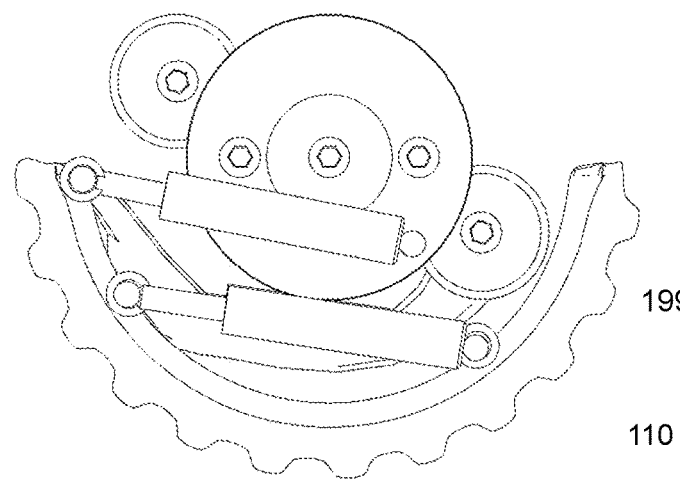
FIG. 14 illustrates an articulated segment component diagram in a roll mode.
Figure 15:
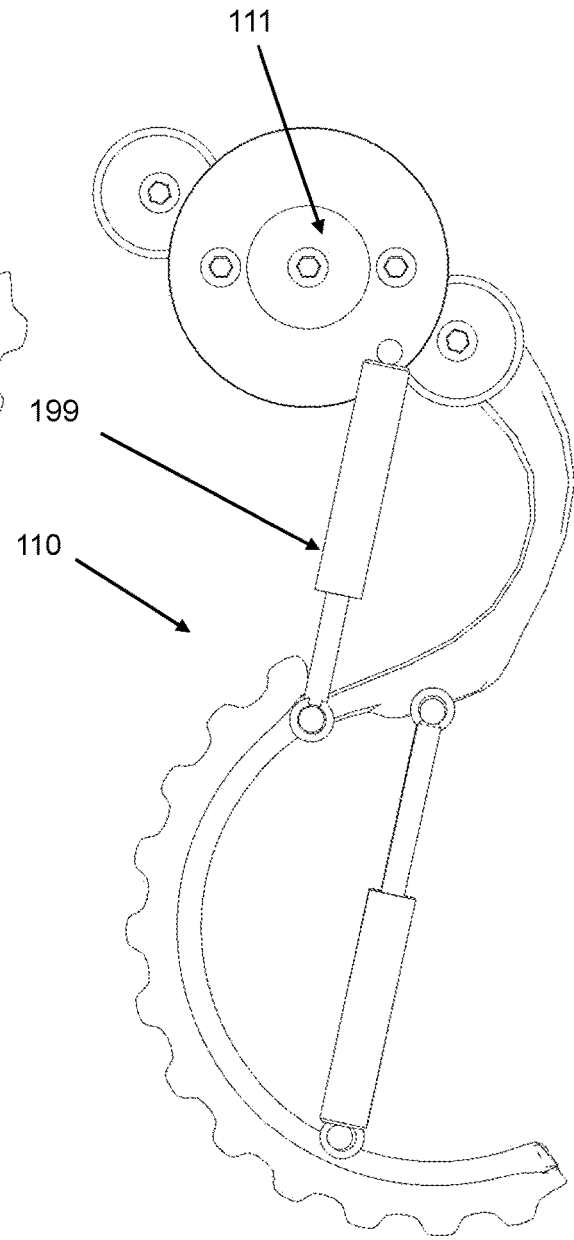
FIG. 15 illustrates an articulated segment component diagram in a climb mode.

For example, FIG. 13-15 illustrates another embodiment with independently powered articulated segments 110 retracted into a circle which may extend like limbs to form contact with stairs or bumpy, irregular surfaces by unfolding or flexing into position independently. Independently powered articulated segments 110 may be made of two arching u-shape components that are parallel to one another in roll mode and pivot away from each other in climbing mode. Linear actuators 199 may be connected between hub 111 and the first arching u-shape component and between the first arching u-shape component and the second arching u-shape component. These embodiments are illustrative and independently powered articulated segments 110 may be comprised of one to an infinite plurality of subcomponents to make up the individual sections.

Independently powered articulated segments 110 are designed to be an array of components making the (whole) wheel shape and also able to act independently to adapt the shape of the wheel. For example, bisected hybrid wheel components are curved to still allow for optimal extended reach dimensions within the circumference of the wheel and crucially that these components adapt/extend into a new shape by means of being comprised of jointed (retractable) independently powered articulated segments 110 that are able to articulate in desired axes of freedom of motion outside the circumference of the wheel.

The articulated hybrid wheel 100 configuration may be subdivided a number of times, and in a number of ways, in any event more than once, with different characteristics of the same solution at the extremes. Another example is a six Segment wheel, that has the same shape component and linkage requirement of fitting "inside" a wheel with their shape, but in different numbers, dimensions, and arc divisions of the wheel. Like other embodiments of articulated hybrid wheel 100, the parts at the outer wheel ring make up the wheel by fitting inside its circumference and also operate by means of pivot/joint extension/flexion independently and in unison to adapt to terrain shapes outside its circumference relative to transport requirements such that that the linked components use rotation by pivot for translation of position in the context of creating contact point(s) unavailable to the traditional wheel during situations when the surface isn't flat.

Dimensions for the articulated hybrid wheel 100 may be derived by calculating the scope of transport and the average vertical change of anticipated obstacles. For example, the average height and width of steps as required by civic and building standards may be used as a value in a formula for determining the optimal diameter of articulated hybrid wheel 100 and the maximum extension of independent powered articulated segments 110.

Other design factors may include spacial considerations, such as where the transport device utilizing one or more articulated hybrid wheel 100 is expected to operate indoors, for example, a wheelchair, and so needs to be sized to pass through doorways and fit within enclosed spaces. These values may be employed to help solve for articulated hybrid wheel 100 width, circumference, and diameter. In further embodiments, other factors may include weight capacity, such as where a transport device is expected to transport heavy payloads, e.g., a movie camera dolly or appliance delivery cart. This value may be employed to help solve for a number of pivots and the diameter hub 111.

Articulated hybrid wheel 100 subdivision numbers and dimensions may be determined by selecting an optimal point in the exponential curves of agility versus capacity, depending on its intended use, such as passenger or payload requirements and service grade; e.g., consumer, commercial, industrial, military, the operational requirements of the mass and volume of the embodiment as dictated by intended use and space environment and operational requirements, and the environmental operational obstacle dimensions versus the power transmission required. The subdivision formula offers tailored benefits to specific applications. For example, articulated hybrid wheels 100 for a light truck might require fewer articulation joints in the segments and heavy-duty linkages. The light truck would deploy articulated hybrid wheel 100 in exceptionally difficult terrain.

Another non-limiting example may be all terrain vehicle wheels, which may be configured to capitalize on the amphibious capabilities of an articulated hybrid wheel 100 for a new dimension in all terrain experience. Another non-limiting example may be for wheelchairs which may be configured to be as light and as strong as possible, and may have at least three pivot joints per section for smooth transportation and an optimal reach. Another example may be a pizza/grocery/package delivery robot with the capability to deliver to a customer's door, even inside brownstone or similar buildings with high steps. This might balance, with the help of a gyroscopic module, on just one or two wheels in order to minimize its footprint. It may have multiple segments for a wide access envelope.

The shape of independently powered articulated segments 110 may be dictated by the combined requirements of the wheel shape in the initial wheel position, its shape for optimal segment extension in the walking position, the capacity of independently powered articulated segments 110, and the geometry to operate without interfering with the other independently powered articulated segments 110. The relative wheel dimensions and placement of the pivots on the articulated hybrid wheel 100 may be based on the Pythagorean formula [triangle] and pi [3.14 . . . ], applied to operational capacity requirements for optimal performance. Operation of the segment kinematics may be determined by interpolation of cartesian coordinates with a high compliance to external forces by sensors 140 and control algorithms for joint interpolated motion.

In other embodiments, there may be segment joints with multiple degrees of freedom of motion for further dexterity, e.g., allowing material handling capabilities. The possibilities for applications may therefore become even more diverse. Stairs and uneven terrain have the similar characteristic of vertical elevation changes preventing a standard wheel safe access. Both the ascending and descending of steep/uneven terrains mandate that the wheel alter its traditional round format. With this invention, the traditional wheel spoke has as noted above been mechanically evolved to emulate jointed limbs which can independently articulate as segments to provide contact with uneven terrain upon which the wheel travels. Movement is provided by the rotation of the wheel, which the extendable segments maintain contact with the terrain for traction, providing contact points for the wheel. Because of the ability to independently articulate the segments, such contact need not be on an even plane or flat surface.

Articulated hybrid wheel 100 may include a control system 120 for operational control of the various other components. Articulated hybrid wheel 100 may include one or more sensors 140 for relative positioning, optimal sequential segment operation, and active feedback. Articulated hybrid wheel 100 may include a battery and charging system 150 for performance regenerative pressure plate power systems and solar charging. Articulated hybrid wheel 100 may include a drive mechanism 160 that may be a high-torque harmonic drive geared hub motor, hydraulic system, or pneumatic system.

Battery and charging system 150 of articulated hybrid wheel 100 provides the energy to power control system 120, sensors 140, and drive mechanism 160 during the process of transportation. Articulated hybrid wheel 100 may be powered by methods known by those of ordinary skill in the art. In some embodiments, articulated hybrid wheel 100 may plug into an electrical outlet using an electrical cord to supply power to control system 120, sensors 140, and drive mechanism 160. Further battery and charging system 150 may include a rechargeable battery pack whereby the rechargeable battery is of a charge, design, and capacity to provide sufficient power to control system 120, sensors 140, drive mechanism 160 during operation for a set period of time needed.

Battery and charging system 150 may have a solar energy collector for collecting and converting solar energy to electrical energy. The solar generated electrical energy then passes through a first controller for distributing the electrical energy. The electrical energy may be stored in a battery; however, it may be used immediately to create a potential energy difference. The battery may hold an electrical-chemical potential sufficient to power the various components of articulated hybrid wheel 100 for a predetermined amount of time.

The battery may be connected to control system 120. Control system 120 may direct current flow to drive mechanism 160 or control system 120 after a preprogrammed or otherwise predetermined amount of time. The control system may include circuitry to provide an interface for the user to interact with, including switches, indicators, and accompanying circuitry for an electronic control panel or mechanical control panel. The interface may present options to the user to select from, such as retracting and extending independently powered articulated segments 110.

Control system 120 may operate to control the actuation of the other systems. Control system 120 may have a series of computing devices which will be discussed in detail later in the description. Control system 120 may be in the form of a circuit board, a memory or other non-transient storage medium in which computer-readable coded instructions are stored and one or more processors configured to execute the instructions stored in the memory. Control system 120 may have a wireless transmitter, a wireless receiver, and a related computer process executing on the processors.

Computing devices of control system 120, may be any type of computing device that typically operates under the control of one or more operating systems which control scheduling of tasks and access to system resources. Computing devices may be a Raspberry Pi® or other computing devices such as but not limited to a phone, tablet, television, desktop computer, laptop computer, networked router, networked switch, networked bridge, or any computing device capable of executing instructions with sufficient processor power and memory capacity to perform operations of control system 120.

The one or more computing devices may be integrated into control system 120, while in other non-limiting embodiments, control system 120 may be a remotely located computing device or server configured to communicate with one or more other control systems 120. Control system 120 may also include an internet connection, network connection, and/or other wired or wireless means of communication (e.g., LAN, etc.) to interact with other components. The connection allows a user such as user to update, control, send/retrieve information, monitor or otherwise interact passively or actively with control system 120

Control system 120 may include control circuitry and one or more microprocessors or controllers acting as a servo control mechanism capable of receiving input from sensors 140 and drive mechanism 160, analyzing the input from sensors 140 and drive mechanism 160, and generating an output signal to drive mechanism 160 and battery and charging system 150. The microprocessors (not shown) may have on-board memory to control the power that is applied to drive mechanism 160, sensors 140, and battery and charging system 150 in response to input signals from the user and from sensors 140

Control system 120 may include circuitry to provide an interface for a user to interact with, including switches and indicators and accompanying circuitry for an electronic control panel or mechanical control panel. Such an interface may present options to the user to select from such as, without limitation, different walking modes and speeds. Control system 120 may be preprogrammed with any reference values, by any combination of hardwiring, software, or firmware to implement various operational modes including but not limited to elevation and terrain values.

The microprocessors in control system 120 may also monitor the current state of circuitry within control system 120 to determine the specific mode of operation chosen by the user. For instance, when "on," the microprocessors may begin to autonomously traverse terrain. Further, such microprocessors that may be part of control system 120 may receive signals from drive mechanism 160, sensors 140, and battery and charging system 150 such as whether any of the components in the various systems need to be replaced.

Figure 4:
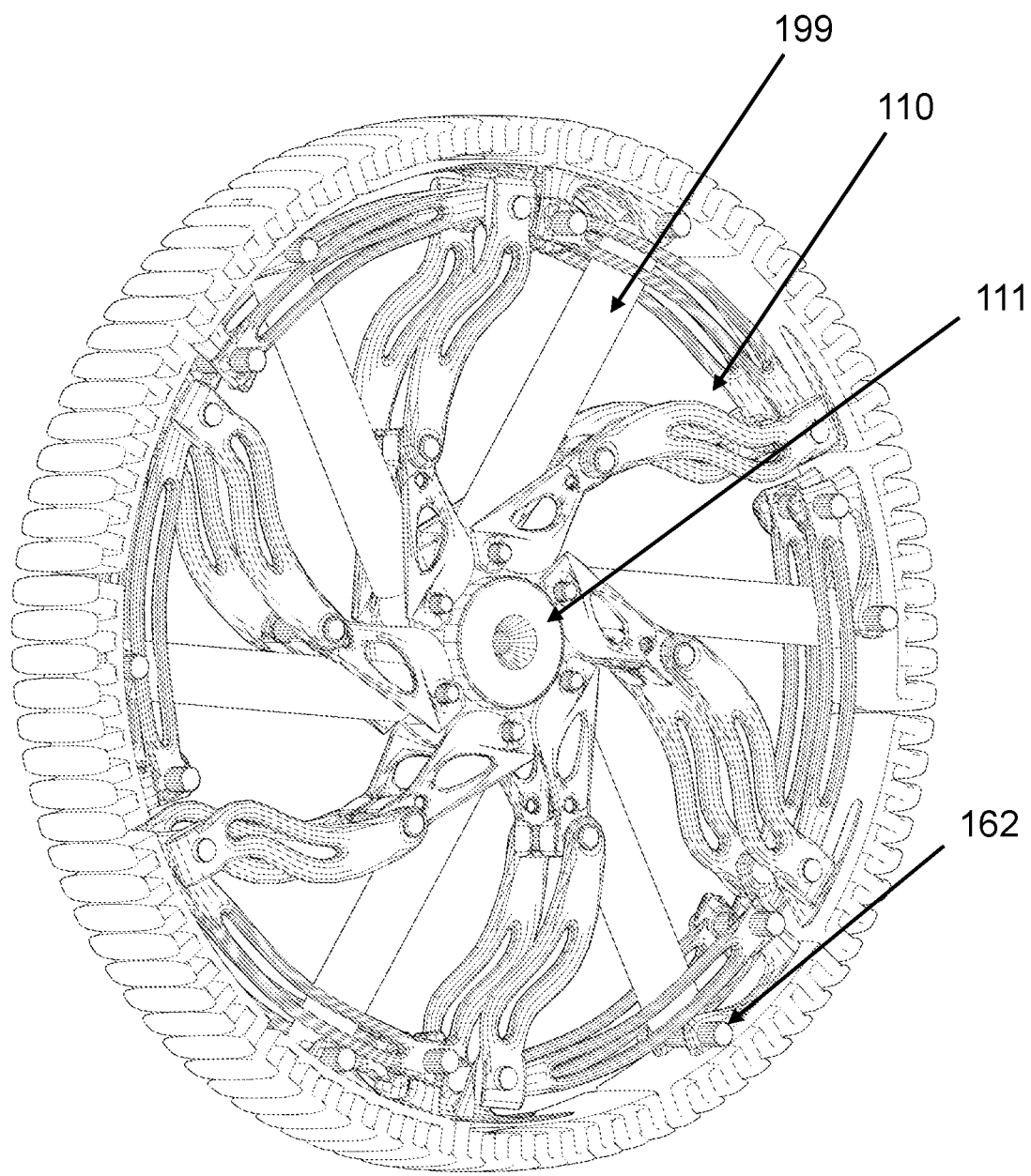
FIG. 4 illustrates a perspective view of Articulated Hybrid Wheel.
Figure 7A:
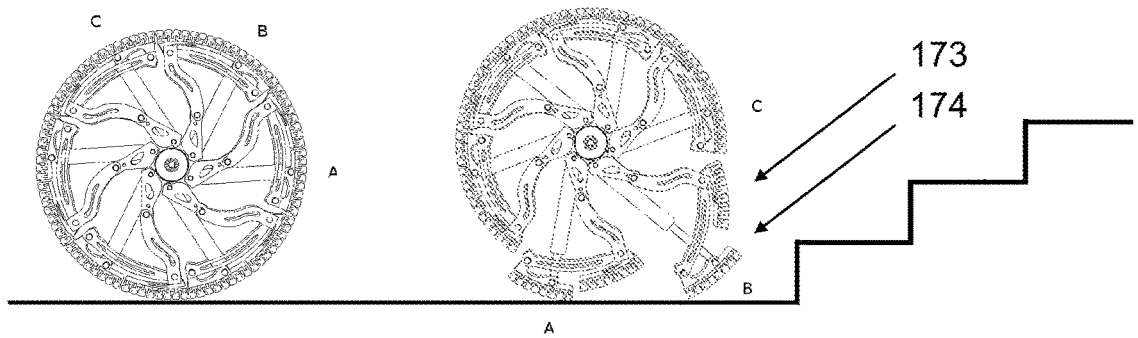
FIG. 7A-7E illustrate a stair climb cycle sequence.
Figure 7B:
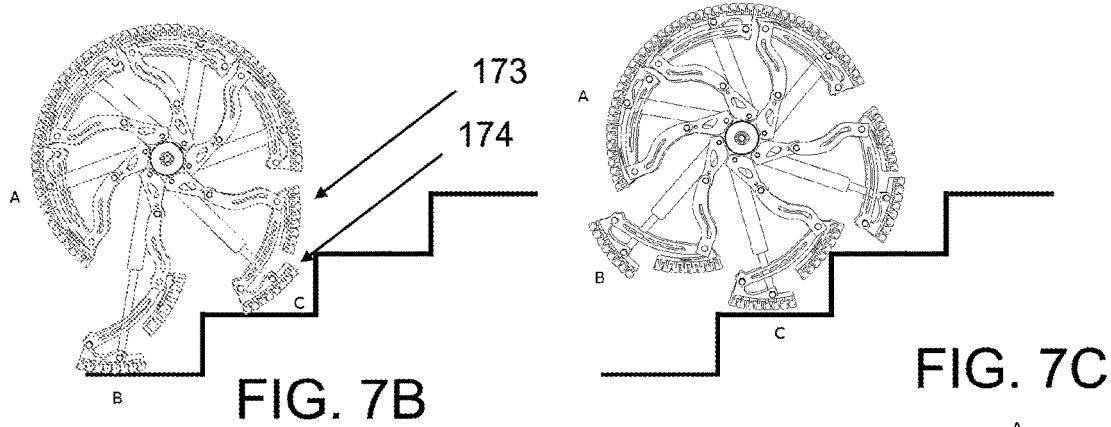
Figure 7C:
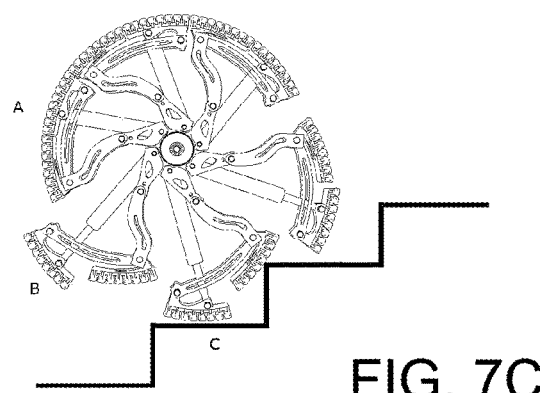
Figure 7D:
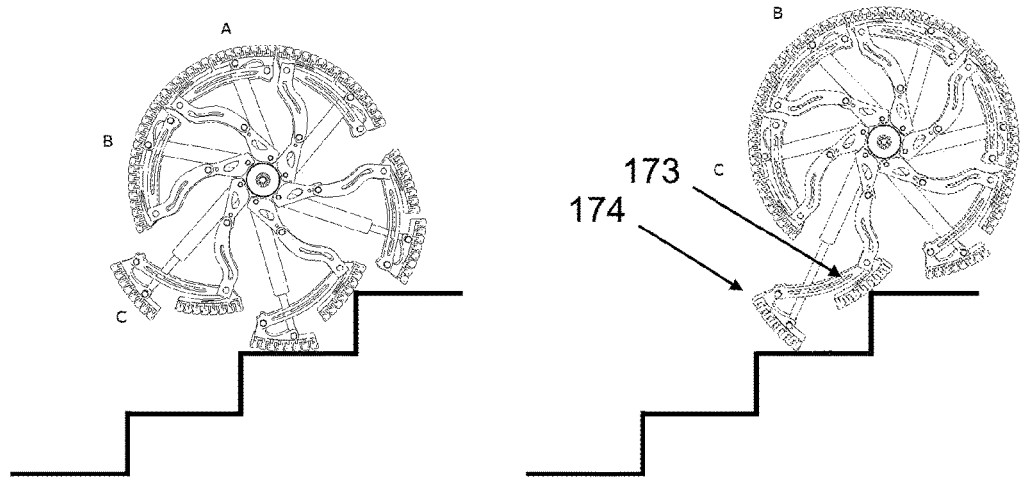
Figure 7E:
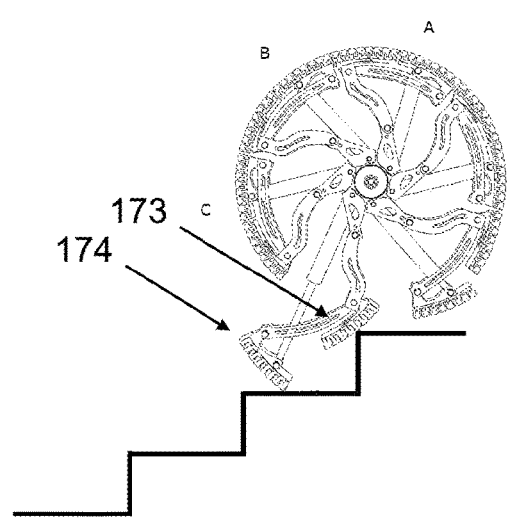

Drive mechanism 160 may have a harmonic drive geared hub motor which lengthens or shortens independently powered articulated segments 110 relative to hub 111 along the y-axis (generally vertical) using one or more linear actuators 199 connected to foot treads 174 by one or more pivots 162, as illustrated in FIG. 4. In further embodiments, drive mechanism 160 may be driven by a hydraulic transmission including one or more linear actuators 199 or a hydraulic cylinder. In another embodiment, drive mechanism 160 may be driven by a pneumatic pump or mechanism using compressed air instead of hydraulic fluid through linear actuators 199. In other embodiments, drive mechanism 160 may instead have rack and pinion mechanisms, screw drives, four-bar mechanisms, motorized jack, manual powered systems, or other mechanical systems known by those of ordinary skill in the art. In further embodiments there may be one or more geared electric motor(s) at each pivot or a mechanically/electronically connected drive system.

Sensors 140 may include a plurality of detectors mounted to the housing of articulated hybrid wheel 100 in the form of standard infrared ("IR") detectors having photodiode and related amplification and detection circuitry. In other embodiments, radio frequencies, magnetic fields, infrared, computer vision, potentiometers, ultrasonic sensors, and transducers may be employed. Detectors may be arranged in any number of configurations and arrangements. For example, in one embodiment, articulated hybrid wheel 100 may include an omnidirectional detector mounted to the top and bottom of articulated hybrid wheel 100 to detect signals from a 360 degrees field of view, while in other embodiments, various detectors may be mounted on the side of articulated hybrid wheel 100 which may be used to form a collective field of view of detection. Control system 120 in combination with sensors 140 may use existing or generated maps and satellites to plan an optimal course for best transport results and efficiency. In some embodiments, articulated hybrid wheel 100 may use any number of Lidar systems with improved scanning speed for high-resolution depth mapping.

Detectors may be in the form of wall detectors on the housing of articulated hybrid wheel 100, which may reflect IR light from the sides of articulated hybrid wheel 100 to determine if articulated hybrid wheel 100 is approaching a wall, a raised object, or incline surface or terrain. The wall detectors send a signal through control system 120 to the microprocessors containing an input value. The microprocessors then compare the received input value using a comparison function and evaluate the input data against a setting or expectation of a certain reference value for an "activation" position stored within the memory of control system 120. In one embodiment, based on if the input data is above or below the expected reference value, articulated hybrid wheel 100 may activate extension or retraction from a set distance from the wall.

Articulated hybrid wheel 100 may further include "detectors" in the form of cliff detectors, which may be able to reflect infrared ("IR") light off the floor near the edges of articulated hybrid wheel 100 to determine if articulated hybrid wheel 100 is approaching a drop off point or other barrier. During operation when articulated hybrid wheel 100 approaches a drop off point, such as the top of a staircase without limitation, the cliff detectors may send a signal through control system 120 to the microprocessors. The microprocessors then compare the received input data using a comparison function and evaluate the input data against a setting or expectation of a certain range stored within the memory of control system 120. For instance, if the calculated distance is greater than the reference distance, the microprocessor sends a signal through control system 120 to drive mechanism 160 whereby Articulated hybrid wheel 100 may begin deployment or extension at a set distance from terrain, variable, or environment change.

Articulated hybrid wheel 100 may have detectors in the form of impact sensors that are triggered when articulated hybrid wheel 100 has a collision with another object to protect and retract components. For example, having detectors may be particularly useful during operation when articulated hybrid wheel 100 is about to collide with an outside object. The impact detectors send a signal through control system 120 to the microprocessors containing an input value. The microprocessors then compare the received input value using a comparison function and evaluate the input data against a setting or expectation of a certain reference value stored within the memory of control system 120. If the calculated value is outside the expected reference value, the microprocessors then send a signal through control system 120 to drive mechanism 160 commanding the motor to drive articulated hybrid wheel 100 away.

As noted above, an aspect of articulated hybrid wheel 100 is that it is divided into diametric segments. Therefore, a bisected articulated hybrid wheel 100 may have two extendable segments making up the drive ring, a trisected wheel may be divided into thirds, having three extendable segments, and so on. From a "split-wheel sprinter" to a "millipede reverse escalator," the number of subdivisions of the wheel into segments is defined by a sliding scale between extremes of agility and capacity as required by its applications.

The process for determining the needed extension or retraction of each segment may be fixed (e.g., preprogrammed in control system 120) or may be variable and is supported by a variety of available input devices, sensory and/or mechanical mechanisms such as sensors 140.

Programmed sequence functions facilitate the wheel operation. The operation may be further refined/optimized by user commands or sensors which are capable of adapting the force feedback and input when executing tasks. With the successive and previous segments one step ahead of and behind in the terrain sequence mode as the hub rotates, each surface contacting leg rolls through its progressive sequence of poses synchronized for its position and speed once per revolution.

As illustrated in FIG. 5 and FIG. 6, independently powered articulated segments 110 may operate in the following steps:
1: Retracted—Home Position (ROLL) Acute Isosceles All Joints at Zero [See FIG. 5]
2: Deploy I—Maximum Reach Pose (REACH & PIVOT) Obtuse Scalene [See FIG. 6]
3: Deploy II—Medium Reach Pose (SQUAT & PIVOT) Equilateral
4: step-raise—Pivot Up Pose (STEP UP & FORWARD) Right
5: step-lower—Pivot Down Pose (STEP DOWN & FORWARD) Right
6: Park Brake—Stability Pose I (STOP) Equilateral
7: Stand Up—Stability Pose II (LIFT) Obtuse The following scenario examples of programmed sequence cycles are for a hexa [6] segment, 28" diameter articulated hybrid wheel 100 [in this example there are 6-60-degree increments for 360 degrees]. Each radian rotation of 60 degrees of the wheel is a 'step,' which bring the next segment into action in offset sequential order:

FIGS. 7A-7E illustrates a scenario example showing one-wheel revolution to ROLL; ROLL step executes the Segment position in sequence starting from the front of the direction of travel: Uphill ROLL, Level ROLL, Downhill ROLL, subsets of the ROLL Sequence which holds its position and transitions to the following Segment in a fluid synchronized manner until a new Mode or stop ROLL. ROLL holds Home Position 1, retracted into Wheel form, the Segments behave like passive suspension spokes:

Segment A in position start ROLL sequence; Wheel rolls [X] distance, keep Segment A retracted
[=1 Radian]; At which point Segment A makes contact with the ground plane [=1 Radian]. Wheel rolls [X] distance, keep Segment A retracted [=2 Radian]. As wheel rolls Segment A has rotated beyond ground contact to rear, Segment A remains retracted [=2 Radian]. Pass sequence to next sequential Segment and recycle the process for ROLL.

Segment B in position start ROLL sequence; Wheel rolls [X] distance, keep Segment B retracted
[=1 Radian]; At which point Segment B makes contact with the ground plane [=1 Radian]. Wheel rolls [X] distance, keep Segment B retracted [=2 Radian]. As wheel rolls Segment B has rotated beyond ground contact to rear, Segment B remains retracted [=2 Radian]. Pass sequence to next sequential Segment and recycle the process for ROLL.

Segment C in position start ROLL sequence; Wheel rolls [X] distance, keep Segment C retracted
[=1 Radian]; At which point Segment C makes contact with the ground plane [=1 Radian]. Wheel rolls [X] distance, keep Segment C retracted [=2 Radian]. As wheel rolls Segment C has rotated beyond ground contact to rear, Segment C remains retracted [=2 Radian]. Pass sequence to next sequential Segment and recycle the process for ROLL.

Segment D in position start ROLL sequence; Wheel rolls [X] distance, keep Segment D retracted.
[=1 Radian]; At which point Segment D makes contact with the ground plane [=1 Radian]. Wheel rolls [X] distance, keep Segment D retracted [=2 Radian]. As wheel rolls Segment D has rotated beyond ground contact to rear, Segment D remains retracted [=2 Radian]. Pass sequence to next sequential Segment and recycle the process for ROLL.

Segment E in position start ROLL sequence; Wheel rolls [X] distance, keep Segment E retracted
[=1 Radian]; At which point Segment E makes contact with the ground plane [=1 Radian]. Wheel rolls [X] distance, keep Segment E retracted [=2 Radian]. As wheel rolls Segment E has rotated beyond ground contact to rear, Segment E remains retracted [=2 Radian]. Pass sequence to next sequential Segment and recycle the process for ROLL.

Segment F in position start ROLL sequence; Wheel rolls [X] distance, keep Segment F retracted

[=1 Radian]; At which point Segment F makes contact with the ground plane [=1 Radian]. Wheel rolls [X] distance, keep Segment F retracted [=2 Radian]. As wheel rolls Segment F has rotated beyond ground contact to rear, Segment F remains retracted [=2 Radian]. Pass sequence to next sequential Segment and recycle the process for ROLL.

FIG. 7A-7E illustrates a scenario example showing one wheel revolution to CLIMB 3 steps; CLIMB step executes the segment positions in sequence starting from the front of the direction of travel: start CLIMB, CLIMB, finish CLIMB, subsets of the CLIMB sequence which transforms through the positions and transitions to the following segment in a fluid synchronized manner until there are no more steps to climb.

Each Radian Rotation of 60 degrees of the wheel is a 'step' which brings the next segment into action in offset sequential order:

Segment A in position start CLIMB sequence; Wheel rolls [X] distance, Deploy Segment A

[=1 Radian]; At which point Segment A makes contact with the plane preceding Step 1[=1 Radian]. Wheel Rotates forward [=1 Radian], Segment A holds retracted pose [=1 Radian] and pivots

[=1 Radian]. As wheel rolls Segment A has rotated beyond ground contact to rear, Segment A remains retracted [=1 Radian]. Pass sequence to next sequential Segment and recycle the process after full rotation if another step.

Segment B in position continues CLIMB sequence; Wheel rolls [X] distance. Deploy Segment B

[=1 Radian]; At which point Segment B makes contact with Ascending Step 1 [=1 Radian]. Wheel Rotates forward and Rises Up [=1 Radian], Segment B holds pose [=1 Radian] and pivots

[=1 Radian]. As wheel rolls Segment B has rotated beyond ground contact to rear, Segment B retract

[=1 Radian]. Pass sequence to next sequential Segment and recycle the process after full rotation if another step.

Segment C in position continues CLIMB sequence; Wheel rolls [X] distance. Deploy Segment C

[=1 Radian]; At which point Segment C makes contact with Ascending Step 2 [=1 Radian]. Wheel Rotates forward and Rises Up [=1 Radian], Segment C holds pose [=1 Radian] and pivots [=1 Radian]. As wheel rolls Segment C has rotated beyond ground contact to rear, Segment C retract

[=1 Radian]. Pass sequence to next sequential Segment and recycle the process after full rotation if another step.

Segment D in position continues CLIMB sequence; Wheel rolls [X] distance. Deploy Segment D

[=1 Radian]; At which point Segment D makes contact with Ascending Step 3 [=1 Radian]. Wheel Rotates forward and Rises Up [=1 Radian], Segment D holds pose [=1 Radian] and pivots [=1 Radian]. As wheel rolls Segment D has rotated beyond ground contact to rear, Segment D retract

[=1 Radian]. Pass sequence to next sequential Segment and recycle the process after full rotation if another step.

Segment E in position continue CLIMB sequence; Wheel rolls [X] distance. Deploy Segment E

[=1 Radian]; At which point Segment E makes contact with the plane at top of steps [=1 Radian]. Wheel Rotates forward [=1 Radian], Segment A holds pose [=1 Radian] and pivots [=1 Radian]. As wheel rolls Segment E has rotated beyond ground contact to rear, Segment E retract [=1 Radian]. Pass sequence to next sequential Segment and recycle the process after full rotation if another step or resume ROLL.

Segment F in position finish CLIMB sequence; Wheel rolls [X] distance, keep retracted Segment F

[=1 Radian]; At which point Segment F makes contact with the Ground plane [=1 Radian]. Wheel Rotates forward [=1 Radian], Segment F holds pose [=1 Radian] and pivots [=1 Radian]. As wheel rolls Segment F has rotated beyond ground contact to rear, Segment F remains retracted [=1 Radian]. Pass sequence to next sequential Segment and recycle the process after full rotation if another step or resume ROLL.

Figure 8A:
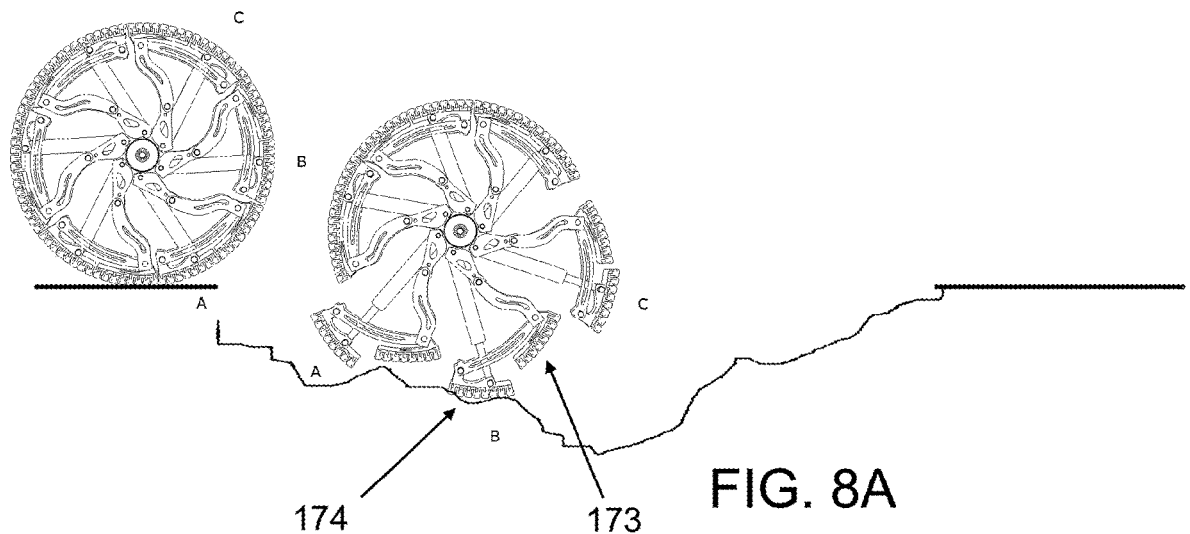
FIGS. 8A-8B illustrates a dynamic cycle sequence.
Figure 8B:
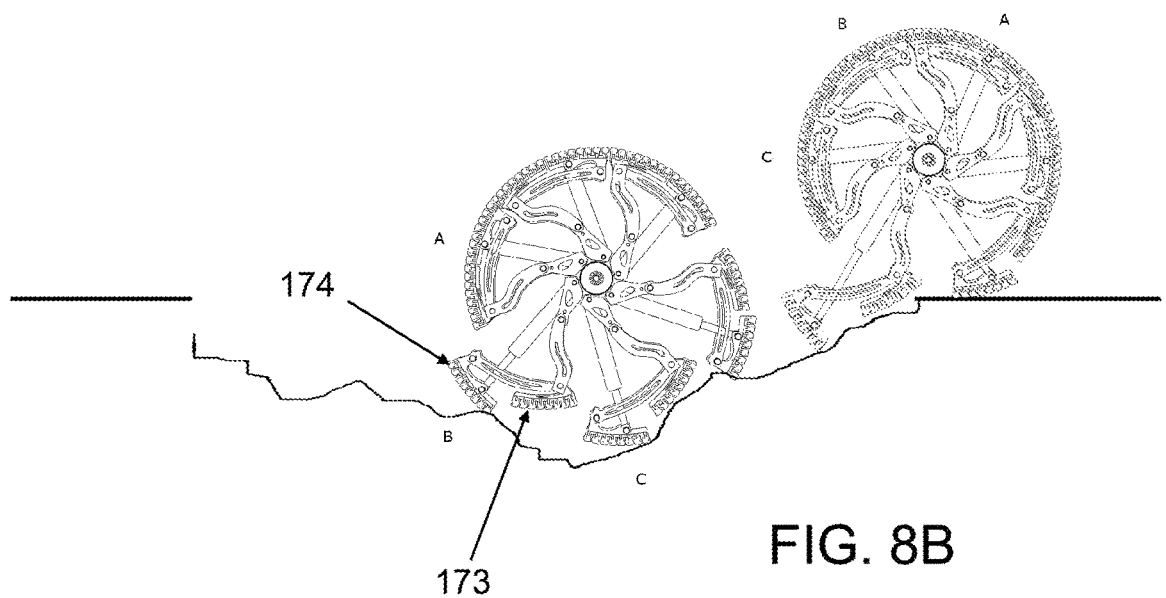

FIG. 8A-8B illustrates an example scenario for All-Terrain Mode used for showing one-wheel revolution of the DYNAMIC Sequence over difficult uneven terrain. This executes the leg positions in sequence starting from the front of the direction of travel: start DYNAMIC, DYNAMIC, finish DYNAMIC, subsets of the DYNAMIC Sequence which transforms through the positions and transitions to the following leg in a fluid synchronized manner until the DYNAMIC terrain sequence is completed. Each Radian Rotation of 60 degrees of the wheel is a 'step' which brings the next segment into action in an offset sequential order:

Segment A in position start DYNAMIC sequence; Wheel rolls [X] distance, keep retracted Segment A [=1 Radian]; At which point Segment A makes contact with level ground [=1 Radian]. Wheel Rotates forward [=1 Radian], Segment A holds pose [=1 Radian] and rotates [=1 Radian]. As wheel rolls Segment A has rotated beyond ground contact to rear, Segment A keeps retracted [=1 Radian]. Pass sequence to next sequential Segment and recycle the process after full rotation if continue DYNAMIC.

Segment B in position continue DYNAMIC sequence; Wheel rolls [X] distance, Deploy Segment B

[=1 Radian]; At which point Segment B makes contact with uneven ground [=1 Radian]. Wheel Rotates forward [=1 Radian], Segment B holds extension pose [=1 Radian] and pivots [=1 Radian]. As wheel rolls Segment B has rotated beyond ground contact to rear, Segment B retract [=1 Radian]. Pass sequence to next sequential Segment and recycle the process after full rotation if continue DYNAMIC.

Segment C in position continue DYNAMIC sequence; Wheel rolls [X] distance, Deploy Segment C

[=1 Radian]; At which point Segment C makes contact with uneven ground [=1 Radian]. Wheel Rotates forward [=1 Radian], Segment C holds extension pose [=1 Radian] and pivots [=1 Radian]. As wheel rolls Segment C has rotated beyond ground contact to rear, Segment C retract [=1 Radian]. Pass sequence to next sequential Leg and recycle the process after full rotation if continuing DYNAMIC.

Segment D in position continues DYNAMIC sequence; Wheel rolls [X] distance, Deploy Segment D [=1 Radian]; At which point Segment D makes contact with uneven ground [=1 Radian]. Wheel Rotates forward [=1 Radian], Segment D holds extension pose [=1 Radian] and pivots [=1 Radian]. As wheel rolls Segment D has rotated beyond ground contact to rear, Segment D retract [=1 Radian]. Pass sequence to next sequential Segment and recycle the process after full rotation if continue DYNAMIC.

Segment E in position continue DYNAMIC sequence; Wheel rolls [X] distance, Deploy Segment E [=1 Radian]; At which point Segment E makes contact with level ground [=1 Radian]. Wheel Rotates forward [=1 Radian], Segment E holds extension pose [=1 Radian] and pivots [=1 Radian]. As wheel rolls Segment E has rotated beyond ground contact to rear, Segment E retract [=1 Radian]. Pass sequence to next sequential Segment and recycle the process after full rotation if continue DYNAMIC or resume ROLL.

Segment F in position finish DYNAMIC sequence; Wheel rolls [X] distance, Deploy Segment F [=1 Radian]; At which point Segment F makes contact with level ground [=1 Radian]. Wheel Rotates forward [=1 Radian], Segment F holds extension pose [=1 Radian] and pivots [=1 Radian]. As wheel rolls Segment F has rotated beyond ground contact to rear, Segment F retract [=1 Radian]. Pass sequence to next sequential Segment and recycle the process after full rotation if continue DYNAMIC or resume ROLL.

Figure 12:
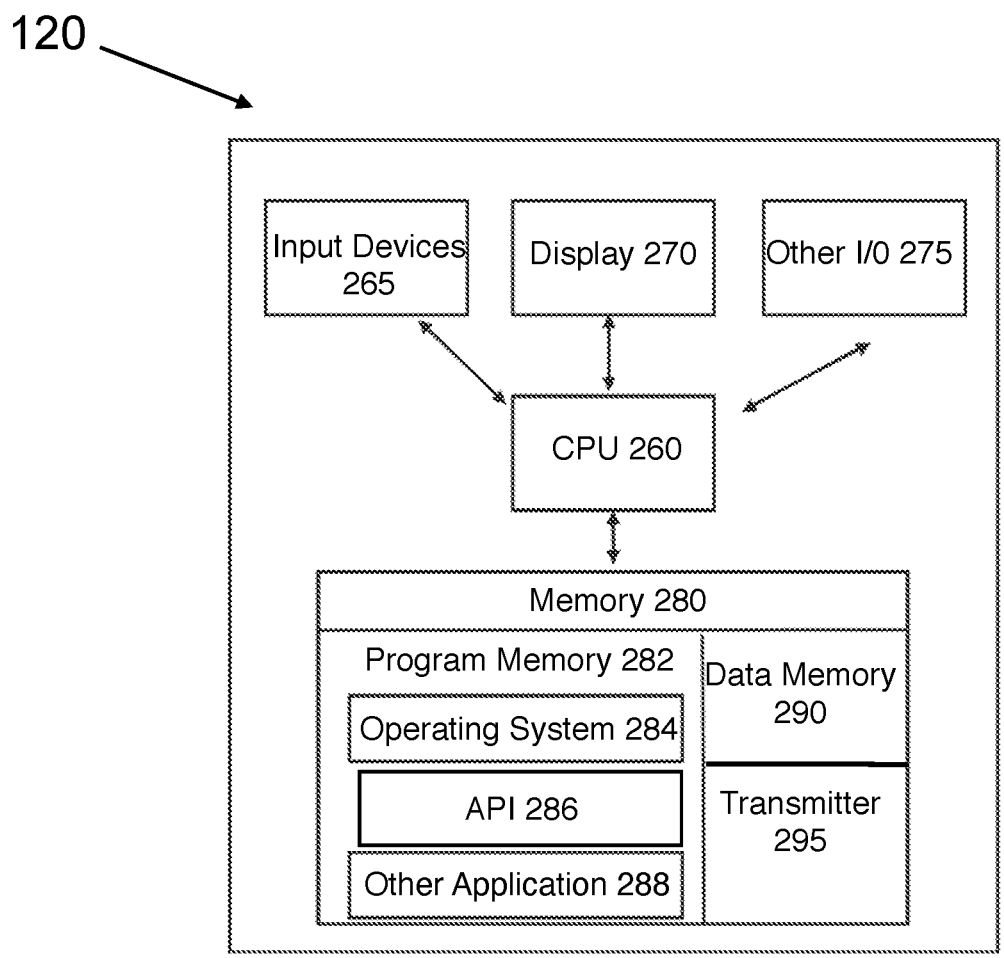
FIG. 12 illustrates a block diagram of the components of the computing devices of the control system.

Turning to FIG. 12, FIG. 12 is a block diagram showing various components of computing devices of control system 120. Computing devices may comprise a housing for containing one or more hardware components that allow access to edit and query communication system 150. Computing devices may include one or more input devices such as input devices 265 that provide input to a CPU (processor) such as CPU 260 of actions related to the user. Input devices 265 may be implemented as a keyboard, a touchscreen, a mouse, via voice activation, wearable input device, a camera, a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device). Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programming interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of computing devices.

Computing devices may have a transmitter 295, such as transmitter 295, to transmit the data. Transmitter 295 may have a wired or wireless connection and may comprise a multi-band cellular transmitter to connect to the server 120 over 2G/3G/4G/5G etc. cellular networks. Other embodiments may also utilize Near Field Communication (NFC), Bluetooth, or another method to communicate information.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An articulated wheel for transporting over smooth and uneven ground in order to achieve geometric strength in two modes of operation, rolling wheel mode and extended reach mode, said articulated wheel comprising:
   a radial hub; and
   a plurality of articulated wheel segments arranged in a radial array about the radial hub, each articulated wheel segment of the plurality of articulated wheel segments comprising:
      a radially extensible support member elongated and arching in shape with a concave and convex surface, and;

a foot member in a pivotable connection with an outer end of the radially extensible support member wherein the foot member is adjustable at an angle to be in a first orientation when the radially extensible support member is in an extended position, and in a second orientation for forming a portion of an outer ring of the articulated wheel when the radially extensible support member is in a retracted position.

2. The articulated wheel of claim 1, further comprising: a drive mechanism, wherein the drive mechanism extends and retracts the radially extensible support members in a sequential manner as the articulated wheel rolls over uneven ground.

3. The articulated wheel of claim 2, wherein the drive mechanism maintains the radially extensible support members in the retracted position as the articulated wheel rolls over smooth ground.

4. The articulated wheel of claim 3, wherein the articulated wheel is in communication with one or more sensors connected to a control system, the one or more sensors configured to generate input data representative of conditions during operation and to provide input data to the control system, the control system storing one or more expected reference values, to compare the input data with the one or more expected reference values, and to output an output signal.

5. The articulated wheel of claim 4, wherein the output signal is derived from the comparison of the input data with the one or more expected reference values, the output signal configured to perform one or more actions in at least the drive mechanism to satisfy a condition of the input data returning to the one or more expected reference values.

6. The articulated wheel of claim 4, wherein the drive mechanism comprises a high-torque harmonic drive geared hub motor connected to a transport vehicle by an axle or a chain drive.

7. The articulated wheel of claim 4, wherein the drive mechanism comprises a hydraulic, pneumatic, electric, or mechanical system.

8. The articulated wheel of claim 4, wherein the drive mechanism comprises one or more actuators connected to the foot member and the radial hub, wherein the one or more actuators drive one or more pivot points to form a desired shape in a relative Cartesian coordinate position.

9. The articulated wheel of claim 1, further comprising: a knee member, the knee member adapted for contact with the uneven ground, wherein when the knee member is in contact with the uneven ground the knee member is at different point and angle from the foot member.

10. The articulated wheel of claim 9, wherein the knee member and the foot member are made of a synthetic rubber or a suitable material for traction and durability.

11. The articulated wheel of claim 5 wherein the one or more sensors are a LIDAR system for determining if the articulated wheel is approaching a wall or a raised object.

12. The articulated wheel of claim 5 wherein the one or more sensors are a LIDAR system for determining if the articulated wheel is approaching a drop off.

13. The articulated wheel of claim 5 wherein the one or more sensors are a LIDAR system for determining if the articulated wheel has come in contact with another object.

14. The articulated wheel of claim 1, wherein the articulated wheel is in communication with a solar energy collector for collecting and converting solar energy to electrical energy to power the articulated wheel.

15. An articulated wheel for transporting over smooth and uneven ground, said articulated wheel comprising:
   a hub; and
   a plurality of articulated wheel segments arranged in a radial array about the hub, each articulated wheel segment of the plurality of articulated wheel segments comprising:
      a radially extensible support member elongated and arching in shape with a concave and convex surface,
      a second support member connected to an inner end of the radially extensible support member,
      a third support member connected to an inner end of the second support member, the third support member connected to the hub at an inner end of the third support member, and
      a foot member in a pivotable connection with an outer end of the radially extensible support member wherein the foot member is adjustable at an angle to be in a first orientation adapted for contact with uneven ground when the radially extensible support member is in an extended position, and in a second orientation for forming a portion of a generally circular outer ring of the articulated wheel when the radially extensible support member is in a retracted position.

16. The articulated wheel of claim 15, wherein the second support member is elongated with a tilde or curved shape.

17. The articulated wheel of claim 16, wherein a middle length of the third support member is of greater width than the inner end and an outer end wherein shape and dimensions of components of the articulated wheel and the articulated wheel segments are based on the number of divisions of the articulated wheel segments and ability of divisions to form a whole wheel when retracted, and a number of extended feet when deployed.

18. The articulated wheel of claim 17, wherein a drive mechanism component is connected to an inside surface of the foot member by a pivotable connection.

19. The articulated wheel of claim 18, further comprising: a knee member connected to the convex surface of the second support member, the knee member adapted for contact with the uneven ground in the first orientation and the second orientation, wherein when the knee member is in contact with the uneven ground the knee member is at a different point and angle from the foot member on a same articulated wheel segment of the plurality of articulated wheel segments.

* * * * *